(No Model.)
G. B. SICCARDI & E. ABBIATI.
CAR BRAKE AND STARTER.
No. 309,743. Patented Dec. 23, 1884.
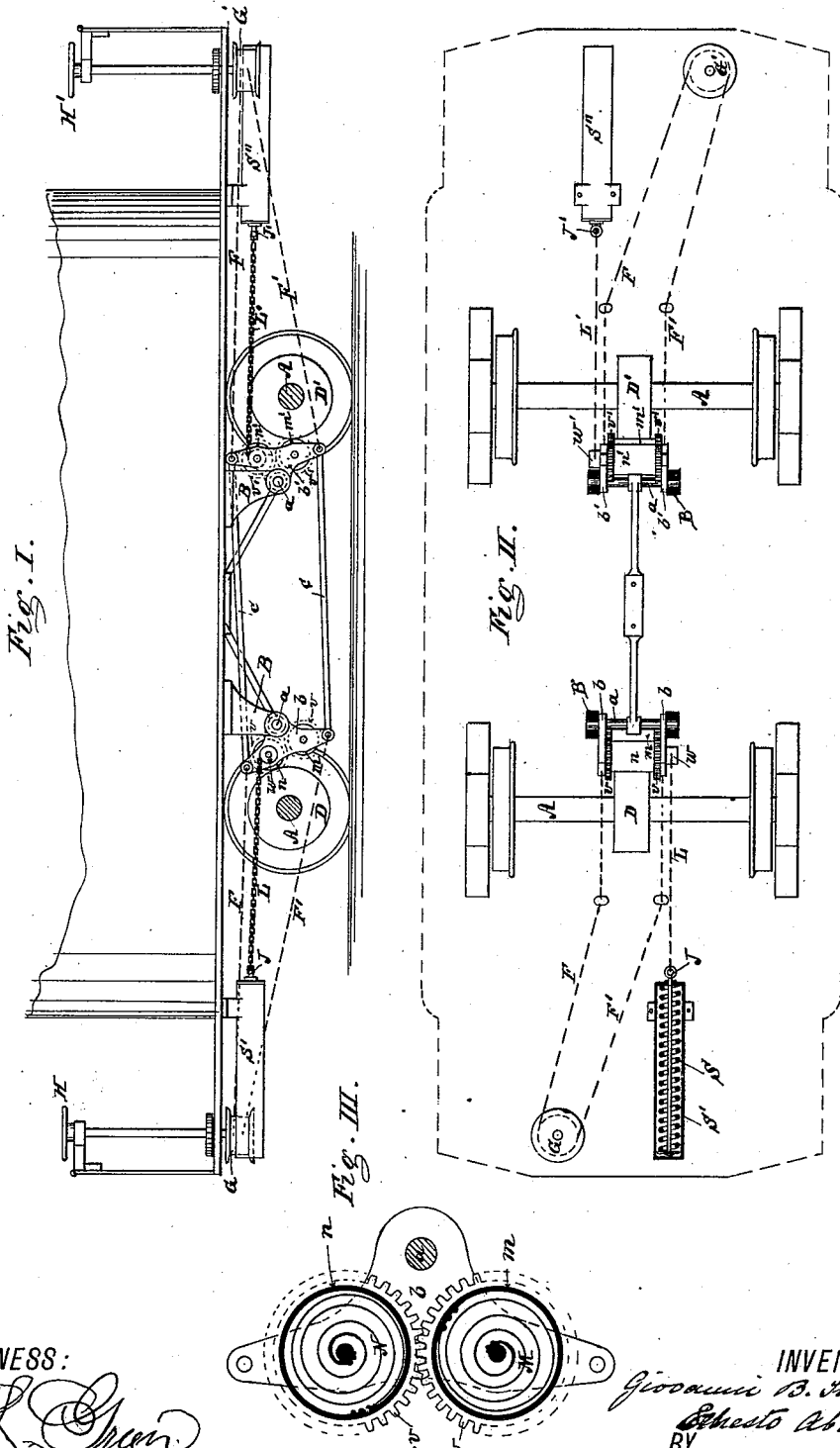
WITNESS:
INVENTORS
Giovanni B. Siccardi
Ernesto Abbiati
BY
Henry E. Roeder
ATTORNEY

UNITED STATES PATENT OFFICE.

GIOVANNI B. SICCARDI AND ERNESTO ABBIATI, OF NEW YORK, N. Y.

CAR BRAKE AND STARTER.

SPECIFICATION forming part of Letters Patent No. 309,743, dated December 23, 1884.

Application filed September 30, 1884. (No model.)

*To all whom it may concern:*

Be it known that we, GIOVANNI B. SICCARDI and ERNESTO ABBIATI, both citizens of the United States, and residing at New York, in the State of New York, have invented a new and useful Improvement in Car Brakes and Starters, of which the following is a specification.

In the accompanying drawings, Figure I represents a side view of part of a horse-car with our improved brake and starter attached. Fig. II is a plan of the same with the car removed. Fig. III is an enlarged view of the brake in section arranged with internal springs.

Similar letters represent similar parts in all the figures.

Between the axles A A suitable brackets, B B, are securely attached to the bottom of the car, carrying bolts $a$ $a$, upon which frames $b$ $b'$ are hung, connected together by rods $c$ $c$, (not shown in Fig. II,) so that any motion given to the frames hung upon one bolt $a$ will be communicated to the other frames. These frames $b$ $b'$ support the brake-wheels $n$ $m$ and $n'$ $m'$, which are connected together by suitable gearing, $v$ $v'$. (Shown in dotted lines in Fig. I.)

Upon the axles A A pulleys D D' are securely fastened, against the surface of which either the brake-wheels $n$ $n'$ or $m$ or $m'$ can be made to work. The upper and lower ends of the forward frames, $b$ $b$, are connected by means of chains F F' with a suitable drum-wheel, G, arranged in the usual manner on the platform of the forward end of the car, and operated by the hand-wheel H, and the upper and lower ends of the other frames, $b'$ $b'$, are connected by similar chains, F F', with a corresponding drum-wheel, G', arranged on the platform at the after end of the car, and operated by a suitable hand-wheel, H', in the usual manner. By this arrangement the brakes can be operated from either end of the car, and as the chains F and F' are connected to the drum-wheels in such a manner that by turning the drum-wheels in one direction the upper end of the frames are moved toward the pulleys on the axles, and by turning the drum-wheels in the other direction the lower ends of the frames are moved toward the pulleys, less than one-quarter of a turn of said drum-wheels will perform this operation. The frames $b$ and $b'$ being connected together through the rods $c$ $c$, the turning of the drum-wheel G in one direction will move the upper end of the frame $b$ toward the pulley D, bringing thereby the brake-wheel $n$ in contact with the pulley D, and at the same time bring the brake-wheel $m'$ in contact with its pulley D'. The turning of the drum-wheel G in the opposite direction will bring the brake-wheel $m$ in contact with the pulley D and the brake-wheel $n'$ in contact with its pulley D', acting thus simultaneously upon both axles.

In Figs. I and II the axles of the upper brake-wheels, $n$ $n'$, are provided with pulleys $w$ $w'$, which are connected by suitable chains, L L', with rods J J', acted upon by spiral springs S, arranged in suitable cases, S' S'', securely attached to the bottom of the car.

In Fig. III the brake-wheels are provided with internal springs, N M, one end of which is attached to the axle of said wheels and the other end to the inside of the wheels.

The operation is as follows: When the drum-wheel G is turned in the required direction, the brake-wheel $n$ will come in contact with the pulley D and the brake-wheel $m'$ in contact with the pulley D', as above described. By the friction of the surfaces of these brake-wheels $n$ and $m'$ with the surfaces of the pulleys D and D' these brake-wheels $n$ $m'$ will be made to turn around. During this operation the chain L will be wound around the pulley $w$, and thus compress the spring S in the box S'. At the same time the brake-wheel $m'$, being connected through the gearing $v'$ with the brake-wheel $n'$, will cause said wheel $n'$ to turn around, winding thereby the chain L' around its pulley $w'$, compressing thereby the spring S in the box S''. When the springs S are compressed in their respective boxes as much as desired, the further turning of the brake-wheels will be stopped, and the same will then act as brakes upon the pulleys D and D', in the usual manner, causing thereby in due time the stopping of the car.

When it is desired to start the car again, the drum-wheel G is turned in the opposite direction, whereby the brake-wheels $m$ and $n'$ will be brought in contact with their respective pulleys D and D'. The previously-compressed springs S will then expand again, causing thereby the brake-wheels *n n'* to turn in the opposite direction, the brake-wheel *n'* acting directly against the surface of the pulley D', and the brake-wheel *n*, through its gearing *v*, upon the brake-wheel *m*, causing thereby the turning of said pulleys D and D', and consequently of the axles A, their wheels, and the car, and thereby assist the force exerted by the horses for that purpose.

It will be readily understood that the operation of the internal springs, N and M, will act in a similar manner to the above-described arrangement.

What we claim as our invention, and desire to secure by Letters Patent, is—

1. The combination of the swinging frames *b b'*, connected together by rods *c c*, brake-wheels *n m* and *n' m'*, connected by suitable gearing, *v v'*, pulleys *w w'*, chains L L', springs S, means of operating the frames *b b'*, with pulleys D D', attached to the axles of the car, arranged to operate substantially in the manner and for the purpose described.

2. The combination of swinging frames *b b'*, connected by rods *c c*, brake-wheels *n m* and *n' m'*, with gearing *v v'*, springs N and M, means of operating the frames *b b'*, with pulleys D D', attached to the axles of the car, substantially as set forth.

GIOVANNI B. SICCARDI.
ERNESTO ABBIATI.

Witnesses:
HENRY E. ROEDER,
J. B. NONES.